United States Patent [19]

Haulot

[11] Patent Number: 4,969,391
[45] Date of Patent: Nov. 13, 1990

[54] WINE-MAKING VAT

[75] Inventor: Olivier Haulot, Nantes, France

[73] Assignee: Societe Atlantique de Techniques Advancees, Nantes, France

[21] Appl. No.: 340,649

[22] Filed: Apr. 19, 1989

[30] Foreign Application Priority Data

Apr. 19, 1988 [FR] France ............................. 88 05166

[51] Int. Cl.$^5$ ............................................. C12G 1/06
[52] U.S. Cl. ................................... 99/277.1; 426/11
[58] Field of Search ............ 99/275, 276, 277, 277.1, 99/277.2, 278; 426/11, 12, 13, 14, 15, 16

[56] References Cited

U.S. PATENT DOCUMENTS

| 3,478,669 | 11/1969 | Lanes | 99/276 |
| 3,823,655 | 7/1974 | Potter | 99/277 |
| 3,871,272 | 3/1975 | Melandri | 99/276 |
| 4,002,111 | 1/1977 | Pujol | 99/276 |
| 4,329,433 | 5/1982 | Seebeck | 99/276 |

FOREIGN PATENT DOCUMENTS 2405300  5/1979  France .

Primary Examiner—Robert W. Jenkins
Attorney, Agent, or Firm—Pollock, Vande Sande & Priddy

[57] ABSTRACT

Wine-making vat comprising a lower fermentation vat (1) and an upper tun (2) and at least one valve (20) putting the fermentation vat (1) and the tun (2) in communication automatically and cyclically, and also comprising a fixed unit fitted on a washing port (4) and forming a valve seat, a movable assembly moving vertically and interacting with valve seat, a movable float, a seal between the movable assembly and the movable float, and an arrangement for retaining the movable assembly on the valve seat.

12 Claims, 7 Drawing Sheets

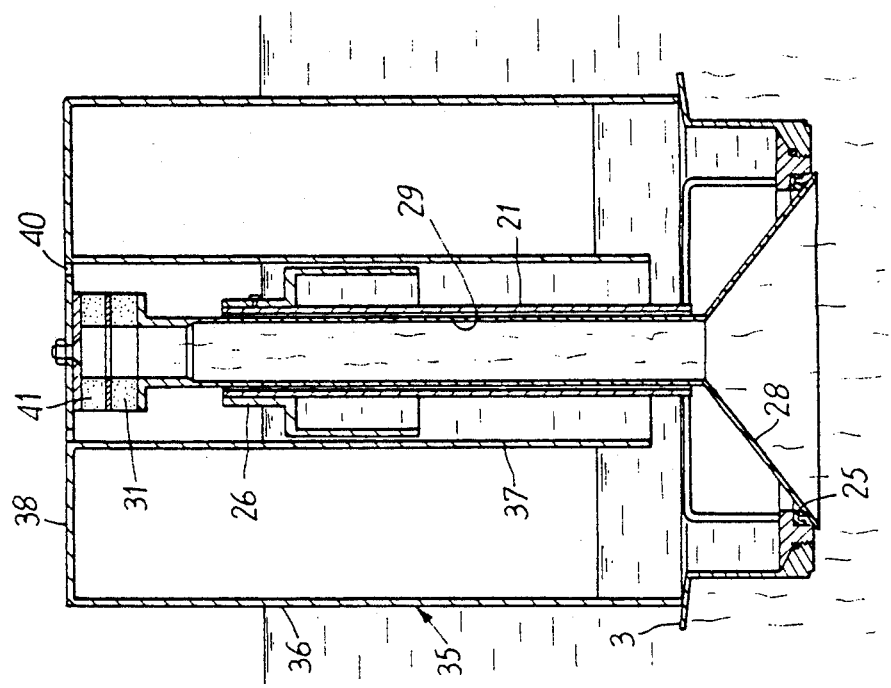
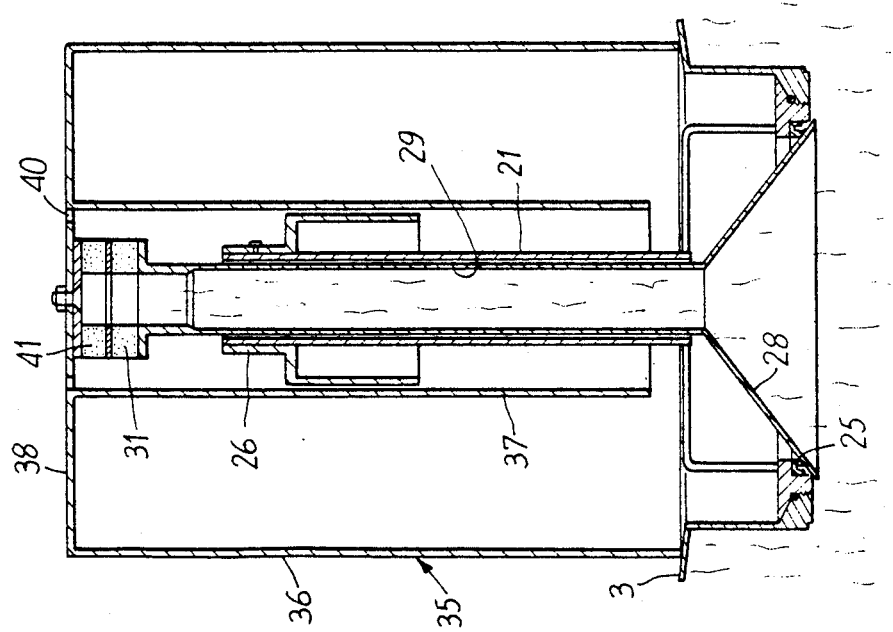

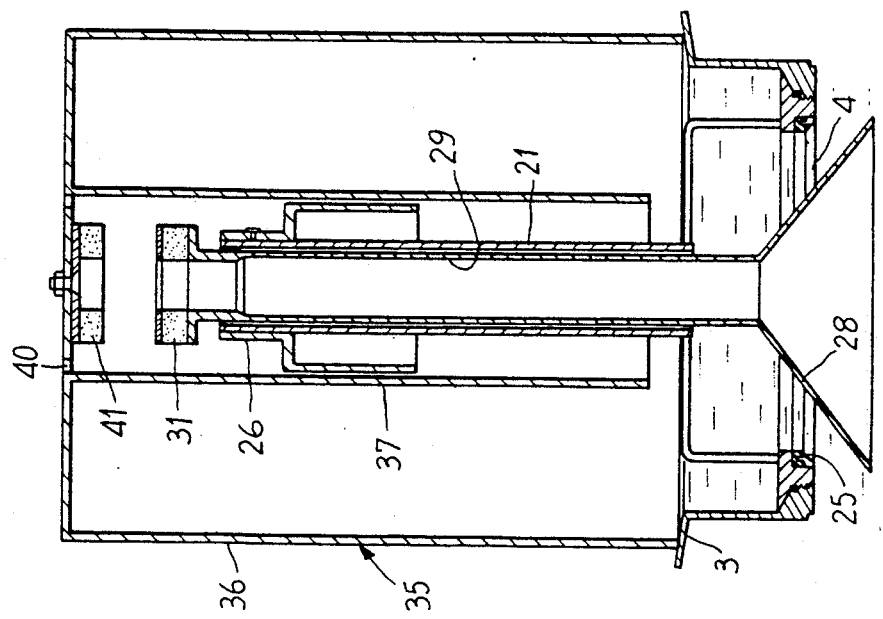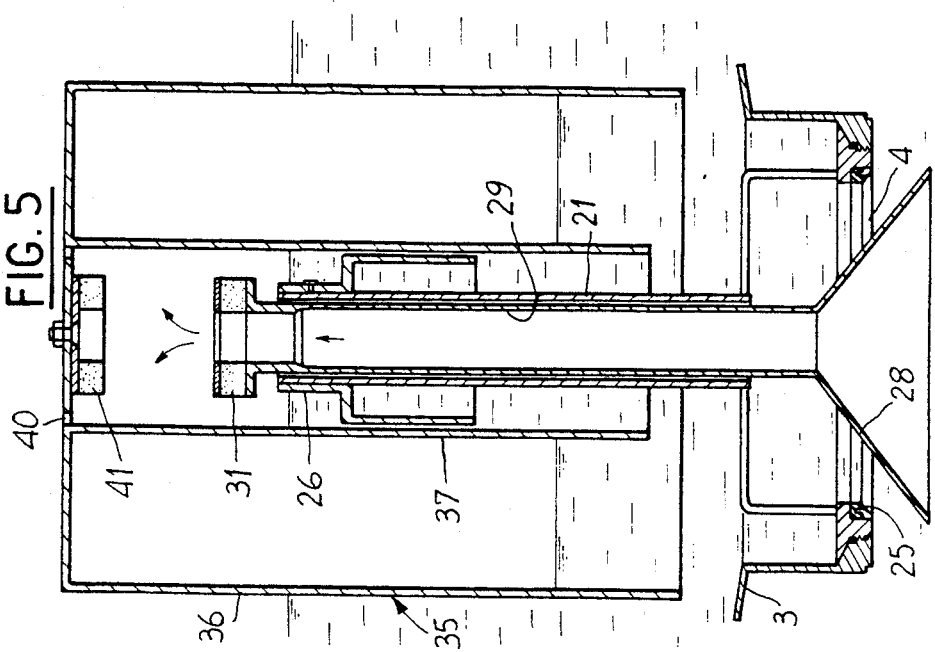

WINE-MAKING VAT

FIELD OF THE INVENTION

The present invention relates to a wine-making vat making it possible to preserve the traditional wine-making process and improve its qualities of aroma, flavor and smell, and its visual qualities. The invention also relates to a wine-making process using the vat.

BACKGROUND OF THE INVENTION

The production of a red wine initially involves removing the stalks from the grapes, which entails picking off the grape berries in order to eliminate the essentially ligneous stalks which could impair the fineness and fruity flavor of the wine. Pressing is subsequently carried out, for the purpose of bursting the berries and extracting the juice therefrom. Pressing must not be too intensive, to avoid crushing the skin or the cuticle and the pips, since this could also be detrimental to the quality of the wine.

At this stage of preparation, the grapes are then placed in a wine-making vat where the conversion of the juice into wine will take place. This conversion essentially involves the phenomenon of fermentation, during which the sugars are converted into ethyl alcohol and carbon dioxide. The juice or must becomes cloudy and heats up, and bubbles of carbon dioxide gas are released.

During fermentation, a liquid phase and a solid phase can be distinguished in the wine-making vat, the liquid phase consisting of the juice or must and the solid phase consisting of the skins or cuticles of the berries, or marc. Because of the release of bubbles of carbon dioxide gas, the marc forms a cake, or marc head, which floats above the juice.

In conjunction with the fermentation, steeping or exchanges of aromatic and coloring substances take place between the marc and the must, and this in fact will give the red wine the characteristics of taste and color peculiar to it. It is therefore important to assist these exchanges and also to prevent the possibility that the marc head will itself be damaged by oxidation. This explains the presence in conventional vats of grids or gratings keeping the marc head submerged, or the dipping operation which involves periodically breaking the marc and submerging it in the juice. The continuous moisturizing of the marc head by the juice assists its subsequent extraction from the vat.

When fermentation is completed, after a period of the order of five to eight days on average, the liquid phase or "first run" is drawn. The marc is extracted from the vat and subjected to a pressing operation to extract from it still the wine which it contains. This "second pressing wine", richer in tannin and dry extracts than the first run, is either treated separately or mixed together with the first run.

The wine-making method for obtaining white wine or white-wine making differs essentially from that for red wine in that, after the possible removal of the stalks, the grapes are subjected to the pressing operation, and only the juice is put in the fermentation vat in order to prevent any coloration by the skins of the berries, whether these come from red grapes with white juice or white grapes with white juice (wine called "blanc de blanc").

Whatever the wine-making method, the conversion of the juice into wine is based fundamentally on an anaerobic alcoholic fermentation or conversion of the natural sugars of the grape (glucose and fructose) into ethyl alcohol according to the reaction:

$$C_6H_{12}O_6 \rightarrow 2(CO_2) + 2(C_2H_5OH).$$

This equation makes it possible to show the large amount of carbon dioxide gas which accompanies the formation of alcohol. In fact, a stoichiometric calculation weighted by a conversion efficiency of 90% makes it possible to see that the conversion of a juice into 1 litre of wine with a titer of 12° of alcohol is accompanied by a release of approximately 50 normal liters of carbon dioxide gas.

However, this equation does not represent all the phenomena which occur during fermentation and which make it necessary for the vine grower to carry out a continuous check of the wine-making process.

Thus, for the fermentation to take place, the presence of certain yeasts is essential. These yeasts of the Saccharomyces type are naturally present on the berries, but their catalytic activity depends largely on the temperature of the medium. So that fermentation can begin, the temperature of the juice must not be below 15° C., the ideal temperature being between 18° C. and 20° C. Furthermore, the fermentation reaction is exothermic, and therefore the temperature of the juice will increase during the process, thus risking being detrimental to the yeasts themselves. In fact, their growth is slowed sharply above 38° C. and they are destroyed between 40° C. and 50° C. In this case, the conversion of the sugar into alcohol will stop and the content of residual sugar in the wine will be too high, at the expense of its percentage of alcohol, and this can also be conducive to the generation of acetic acid.

In fact, for making red wine, the temperature during fermentation is set between 25° C. and 30° C., which is an ideal range for the fermentation itself and also for the exchanges of substances by steeping.

For making white wine, the temperature is a little lower, to give this type of wine its particular characteristics, the temperature of the juice being maintained between 18° C. and 25° C.

These constraints are well known to those skilled in the art, and for that reason most of the modern wine-making vats comprise heat exchangers making it possible to heat or cool the juice in order to adjust its temperature to the requisite value.

Although the presence of some biochemical species, (such as the Saccharomyces yeasts, which moreover are naturally indigenous in the vineyards) is essential for the proper execution of the wine-making process, it is important to protect the fermentation medium against the uncontrolled infiltration of atmospheric air; in fact, oxidation and extraneous seeding with bacteria can give rise to undesirable parallel fermentations detrimental to the alcoholic fermentation or to plainly harmful reactions, such as, for example, acetic aerobic fermentation or the generation of acetic acid by acetic bacteria.

To meet these various requirements, wine-making installation must make it possible to adjust the temperature of the juice for the start of fermentation and during fermentation; mashing of the juice makes it possible to obtain a uniform temperature and also a mass distribution of the fermentation reactions. This is beneficial to the steeping of the marc and must, more especially for making red wine. Furthermore, the installation must allow wine-making in an anaerobic and aseptic medium and provide a flexibility of use, so that it can be adapted to the traditional process particular to the vineyard, and be simple and inexpensive to operate and maintain.

FR-A-1,267,311 makes known a wine-making vat which is divided into two parts by means of a horizontal partition, the lower part forming the actual wine-making vat in which the alcoholic fermentation takes place, and the upper part forming a tun into which the juice is periodically transferred in order subsequently to descend and thereby sprinkle the marc head. The apparatus also includes a riser column, via which the juice passes from the vat towards the tun, a washer having a hydraulic lock, via which the juice can flow from the tun towards the vat, at the same time sprinkling the marc head, and finally a hydraulic valve by means of which the carbon dioxide gas contained in the vat can escape to atmosphere.

Since the hydraulic lock of the washer and that of the valve have previously been filled with water or juice, the carbon dioxide gas obtained as result of the alcoholic fermentation causes an increase in the pressure of the gas atmosphere prevailing in the vat above the grapes. The juice rises via the riser column and overflows into the upper tun. When the pressure of the carbon dioxide gas exceeds the value corresponding to the maximum height of the hydraulic lock of the valve, the carbon dioxide gas escapes directly to atmosphere, thus resulting in a pressure drop in the vat, and the juice contained in the tun flows via the washer towards the fermentation vat, at the same time sprinkling the marc head.

A disadvantage of this apparatus is that the juice is permanently covered by the carbon dioxide gas. In fact, the juice present in the tun is covered solely by the carbon dioxide obtained as result of the degassing taking place in the tun, this covering of carbon dioxide gas itself being in contact with the atmospheric air. Thus, during the movements of the juice in the tun and especially during discharge via the washer, there occurs uncontrolled oxygenation of the juice which can be detrimental to the subsequent quality of the wine. In fact, even if juice oxygenation phases are carried out in some processes for making red wine, these phases must be perfectly controlled in terms of the flow rate and aseptic quality, in order to govern the secondary fermentations and prevent extraneous seeding with undesirable aerobic bacteria, such as, for example, acetic bacteria. Furthermore, this arrangement leads, in the tun, to a loss by evaporation of ethyl alcohol and of the aromatic elements fundamental for the organoleptic characteristics of the wine.

FR-A-2,489,709 and FR-A-2,489,837 make known wine-making vats which, like that in FR-A-1,267,311, comprise a fermentation vat and an upper tun for the transfer of juice and for sprinkling or washing the marc head. The tun is emptied either by means of a flexible diaphragm valve, as in FR-A-2,489,709, or by means of a remote-controlled valve, as in FR-A-2,489,837.

In these documents, the rise of the juice is obtained by means of a column connecting the vat to the tun, the latter having previously been placed under a vacuum by means of a pump and a set of valves arranged on top of the tun. When the level in the tun reaches a set value, a detection system puts the tun in communication with the atmospheric pressure, thereby stopping the rise of the juice which can redescend into the vat, at the same time sprinkling the marc head, either by the automatic opening of the diaphragm valve or by the controlled opening of the communication valve.

The design of the tun and its functioning are such that, when the vacuum is cancelled, the juice, while it is falling through the washing port, sucks up air via the grating putting the tun in communication with the atmosphere, thus presenting the same risks of uncontrolled oxygenation and seeding as in FR-A-1,267, 311. Furthermore, these apparauses make use of complicated equipment, such as, for example, a vacuum pump, a set of shutters and valves, etc.

SUMMARY OF THE INVENTION

The object of the present invention is to overcome these disadvantages, while at the same time adhering as closely as possible to the concepts of modern oenology and making it possible to obtain the best possible wine from the grapes naturally and in the traditional way, especially allowing a continuous check of the liquid and gaseous phases, a check of the possible injections of products, and an aseptic medium.

The subject of the invention is, therefore, a wine-making vat comprising a lower fermentation vat and an upper tun which communicate with one another via a closeable washing port and which are connected by means of at least one column for the rising of the juice from the fermentation vat towards the tun, and at least one valve putting the fermentation vat and the tun in communication with one another automatically and cyclically and comprising:

a fixed unit fitted on the washing port and forming a valve seat, a movable assembly moving vertically and interacting with the said valve seat, a movable float likewise capable of moving vertically, sealing means between the movable assembly and the movable float, and means for retaining the movable assembly on the valve seat as a function of the height of the level of juice in the tun detected by the said float.

According to another characteristic of the invention, the fixed unit comprises, in the lower part, an annular piece fitting on the washing port and euipped with a peripheral gasket forming the valve seat, and a tubular piece fastened to the valve seat and forming a guide member for the movable assembly.

BRIEF DESCRIPTION OF THE DRAWINGS

The invention will be better understood from the following description of several embodiments of the invention given by the way of example and with reference to the accompanying drawings, in which:

FIGS. 3 to 6 are schematic views showing the various operating steps of the automatic valve;

DESCRIPTION OF PREFERRED EMBODIMENTS

Figure 1:
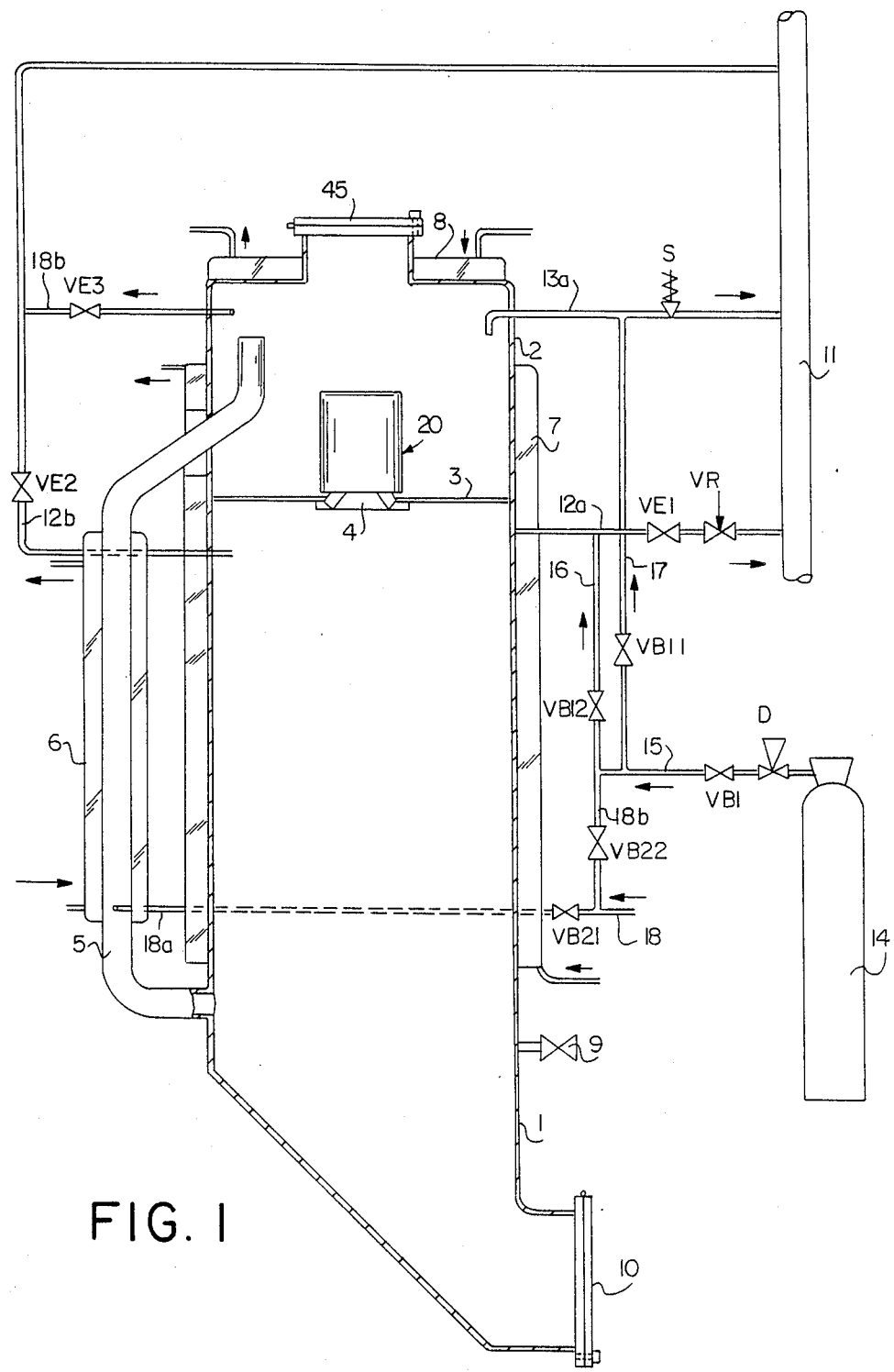
FIG. 1 is a schematic sectional view of a wine-making vat according to the invention.

The wine-making vat illustrated in FIG. 1 comprises a lower vat 1, in which the alcoholic fermentation takes place, and a tun 2, into which the juice is transferred periodically, as will be explained herein below.

The fermentation vat 1 and the tun 2 are separated by means of a horizontal partition 3 having a port 4, on which an automatic valve 20 is placed.

On the other hand, the fermentation vat 1 is connected to the tun 2 by means of at least one riser column 5 which is equipped with a heat exchanger 6 and through which the juice passes.

In order to keep the juice at a temperature within the range necessary for ensuring the start of fermentation and also during the actual fermentation itself, a heat exchanger 7 can be arranged on the fermentation vat 1 and on the tun 2. A cooling exchanger 8 can also be arranged on the cover of the tun 2, in order to condense the aromas and the ethyl alcohol. The exchangers illustrated by way of example are of the double-wall type, and the exchange fluid can be water circulating in this double wall.

The fermentation vat 1 also includes the conventional devices for making it possible to empty it when fermentation has ended, such as, for example, a juice extraction valve 9 or "decanting valve", a trap door 10 and marc extraction means (not shown).

The upper part of the fermentation vat 1 is connected to a column 11 for the discharge of carbon dioxide gas via a first pipeline 12a equipped with a valve VE1 and with a needle tap VR which can also consist of an adjustable reducing valve of the overflow type, and via a second pipeline 12b equipped with a valve VE2.

The same applies to the upper part of the tun 2, which is connected to the column 11 by means of a first pipeline 13a equipped with a reducing valve S of the overflow type, the operating pressure of which is set at a pressure slightly higher than atmospheric pressure, for example of the order of a few millibars, and by means of a second pipeline 13b equipped with a valve VE3.

The column 11 discharges the carbon dioxide gas to the outside of the plant, thus ensuring greater safety for the staff than the conventional vats or than vats having a tun ventilated by the atmospheric air.

A bottle 14 of inert gas, for example carbon dioxide, is connected, by means of a general feed conduit 15 having a valve VB1 and a reducing valve D, to the pipeline 12a opening into the upper part of the fermentation vat 1 via a pipeline 16 equipped with a valve VB12, as well as to the pipeline 13a opening into the upper part of the tun 2 via a pipeline 17 equipped with a valve VB11.

Finally, the riser column 5 is connected to a supply 18 of air of a quality suitable for comestibles by means of a pipeline 18a equipped with a valve VB21, this supply 18 also communicating with the pipeline 16 via a pipeline 18b equipped with a valve VB22.

Figure 2:
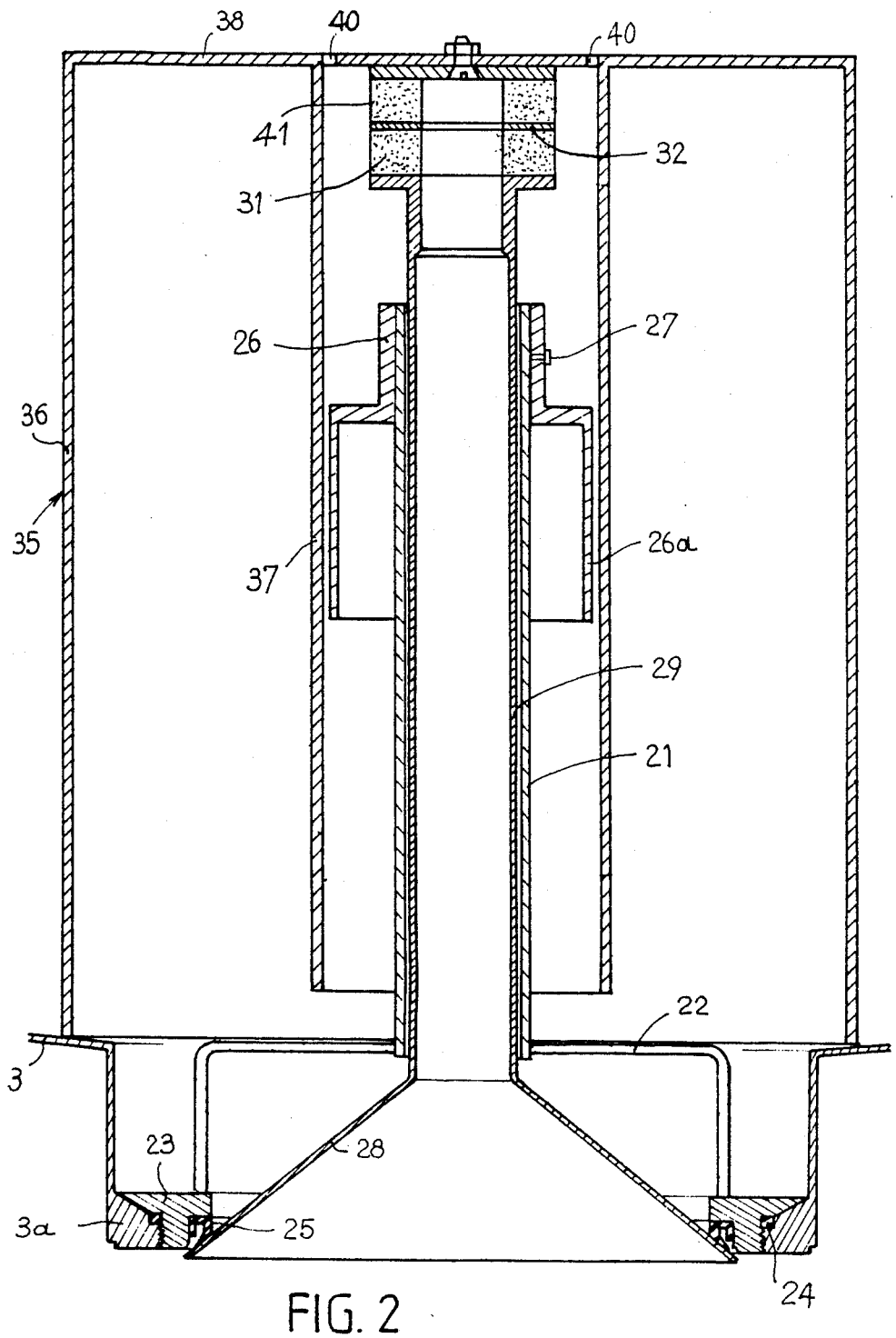
FIG. 2 is a sectional view of the automatic valve of FIG. 1 on a larger scale.

The automatic valve 20 shown on a larger scale in FIG. 2 consists of a fixed unit formed by a tubular piece 21 which is connected in its lower part, by means of several lugs 22, to a ring 23 fitting on a shoulder 3a provided in the port 4 of the partition 3 and which is fastened to the said ring by means of an assembly of the screw or bayonet type. A sealing gasket 24 is compressed between the ring 23 and the shoulder 3a.

The ring 23 also contains a peripheral gasket 25, for example of the lip type, which forms a valve seat.

Fastened to the tubular piece 21 is a stop 26, the height of which is adjustable by means of screws 27 and which has a guide 26a.

The valve 20 also comprises a vertically movable assembly which is formed, in the lower part, by a frusto-conical portion 28 interacting with the valve seat formed by the peripheral gasket 25, so as to close off the port 4. The frusto-conical portion 28 is surmounted by a tube 29 sliding inside the fixed tubular piece 21 and having in its upper part, a support 30 to which a toroidal permanent magnet 31 is fastened. An O-ring or disc-shaped gasket 32 is fastened directly to the magnet 31.

Finally, the valve 20 has a float 35 which, in this first embodiment, consists of two concentric cylindrical casings 36 and 37, both open at their lower ends and closed at their upper ends by means of a flat bottom 38. The float 35 is centered by the guide 26a of the stop 26 which interacts with the inner casing 37.

The central part of the bottom 38 has an annular orifice which can be formed, for example, by a set of holes 40. On the other hand, the bottom 38, on its inner face and in the extension of the tube 29, has a toroidal permanent magnet 41 retained by means of a fastening member 42 and interacting via its attractive force with the permanent magnet 31 arranged on tube 29.

When the wine-making vat is placed into operation, the valve 20 is withdrawn from the port 4 and the grapes are poured into the fermentation vat 1 by means of a tube (not shown) introduced through the manhole 45 and the port 4. The automatic valve 20 is subsequently put in place in the port 4 and the manhole 45 of the tun is closed.

At this stage, the wine-making vat as a whole contains atmospheric air. If the wine-maker considers it necessary, he carries out a scavenging operation by means of the carbon dioxide gas coming from the bottle 14 and introduced simultaneously at the same pressure into the fermentation vat 1 and the tun 2, by opening the valves VB11, VB12, VE2 and VE3, so as to expel the air and oxygen. The valves VB11, VB12, VE2 and VE3 are subsequently closed again. Since there is no liquid phase present in the tun 2 and the gas phases in the fermentation vat 1 and in the tun 2 are at the same static pressure, the float 35 is in the lower part as a result of its own weight, and since the attractive force of the permanent magnets 31 and 41 is higher than the weight of the moveable assembly 28 and 29, the latter is therefore in the high position, and the frusto-conical portion 28 bears on the gasket 25, thus closing off the port 4.

When the conditions for seeding with yeast and for the temperature of the grapes are satisfactory, the ethyl alcohol fermentation in the fermentation vat 1 starts and the carbon dioxide gas thereby formed enters the tube 29 of the valve 20 (FIG. 3). The formation of carbon dioxide gas causes an increase in the pressure of this gas above the grapes in the fermentation vat 1, and the juice begins to rise towards the tun 2 via the riser column 5.

The fermentation and the generation of carbon dioxide gas proceed, the juice continues to rise in the tun 2 and the level in the latter rises correspondingly (FIG. 4). The float 35 tends to lift, but it remains in the low position, and the port 4 is therefore closed by the frusto-conical portion 28 of the movable assembly, as long as the attractive force of the two magnets 31 and 41 is higher than the buoyancy of the float 35, this being defined as being the difference between the Archimedean thrust on the submerged volume of the float 35 and the dead weight of the said float. This Archimedean thrust or resultant of the hydrostatic pressure forces is obviously a direct function of the height of the level of the juice in the tun 2.

As shown in FIG. 5, with the level of juice in the tun 2 continuing to rise, the buoyancy of the float 35 becomes greater than the attractive force of the magnets 31 and 41, and the float 35 lifts off the tube 29 of the movable assembly, thus opening the upper orifice in the said tube. Because of the higher pressure of the carbon dioxide gas in the fermentation tank 1, the carbon dioxide gas therefore passes through tube 29, and the static pressures of the gaseous phases of the fermentation tank 1 and of the tun 2 are balanced.

From the moment when the magnets 31 and 41 are separated from one another, the movable assembly 28, 29 is subjected to the system of force along an ascending vertical and along a descending vertical. The forces along the ascending vertical are generated as a result of the basic effect of the pressure of the carbon dioxide gas in the fermentation vat 1 on the closing cross-section of the movable assembly. The forces along the descending vertical are generated by the weight of the shutter, the hydrostatic load corresponding to the height of the juice in the tun 2, and the basic effect of the pressure of the carbon dioxide gas in the tun on the cross-section of the tube 29 of the movable assembly.

The carbon dioxide gas escapes through the orifices 40, and, when the pressure of the carbon dioxide gas in the fermentation vat 1 falls below the value corresponding to a strict equilibrium in the closing position of the movable assembly 28, 29, the latter descends and thus opens the port 4. The end of the tube 29 comes to bear on the stop 26.

The juice then descends towards the fermentation vat 1 in a flow in the form of a film and sprinkles the marc head floating on the must in the fermentation vat.

As the juice continues to flow off, the tun 2 empties, and the float 35 falls into the low position as result of its own weight because it is no longer subjected to the Archimedean thrust (FIG. 6). In this position, the two magnets 31, 41 are at such a distance that the attractive force is higher than the weight of the movable assembly 28, 29, the latter therefore executing an ascending movement and once again closing the port 4.

The stop 26 on the fixed tube 21 makes it possible to adjust the travel of the movable assembly, so that the latter is compatible with the distance corresponding to the attractive force of the two magnets 31, 41.

At the end of this step, therefore, the movable assembly 28, 29 is reengaged in the "closing" position and the successive operations of filling and emptying the tun 2 can proceed according to a pattern identical to what has just been described, and automatically and cyclically for the entire phase of fermentation of the grapes.

Figure 7:
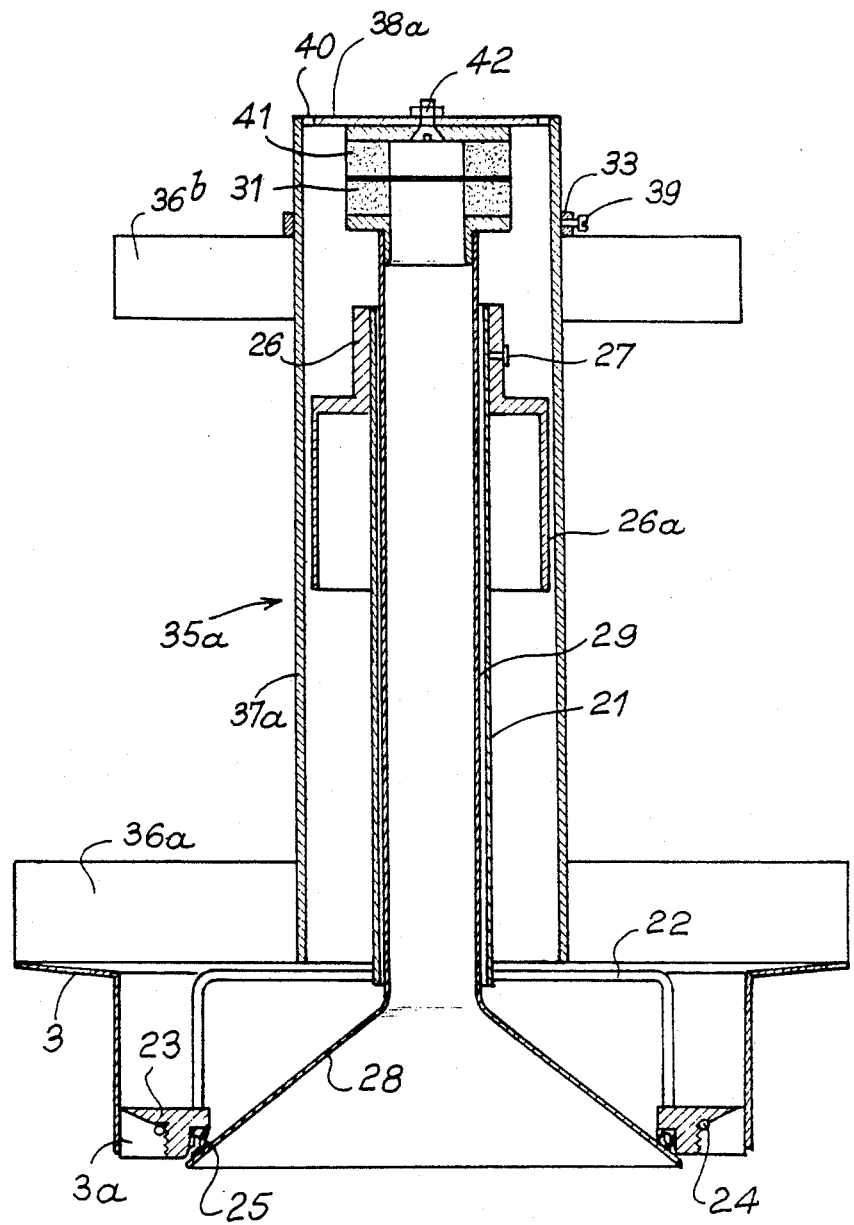
FIG. 7 is a sectional view of an alternative version of the automatic valve.
Figure 9:
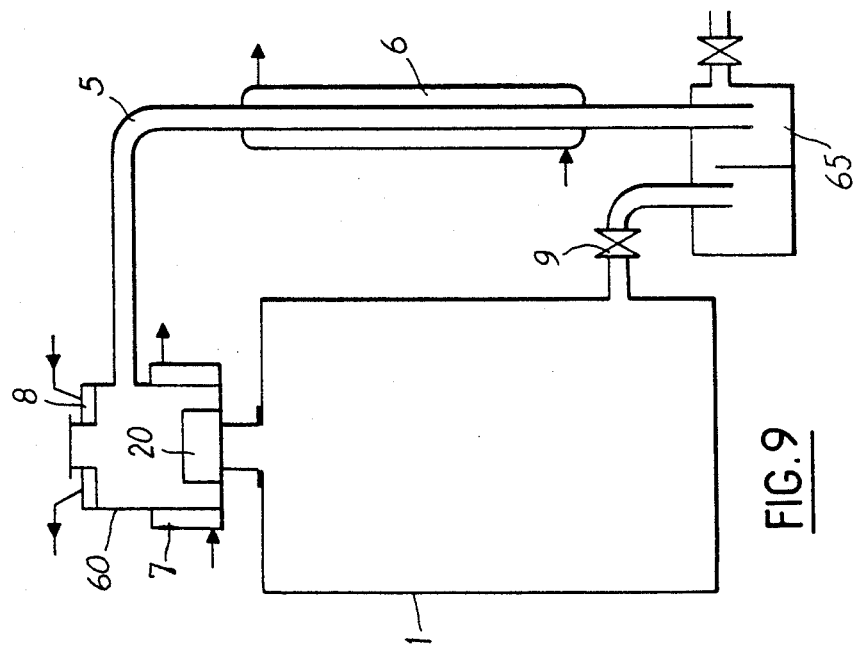
FIG. 9 is a schematic view of a modular tun which can be fitted on an existing fermentation vat.

According to an alternative embodiment illustrated in FIG. 7, the automatic value 20 comprises, as in the preceding alternative embodiment, a fixed unit 21, 22 and 23 fitted on the washing port 4 and forming the valve seat 25, a movable assembly 28, 29 moving vertically and interacting with the said valve seat, and permanent magnets for retaining the movable assembly on the valve seat 25.

However, in this embodiment, the float 35a consists of a cylindrical casing 37a which interacts with the guide 26a of the stop 26. This cylindrical casing 37a is open at its lower end and closed off at its upper end by means of a flat bottom 38a having an annular orifice 40 in its central part.

The float 35a also includes two bouyancy elements 36a and 36b, arranged on the cylindrical casing 37a. The buoyancy element 36a is fastened to the lower part of the cylindrical casing 37a and performs the function of compensating the weight of the float as a whole, while the buoyancy element 36b ensures that the movable assembly 28, 29 opens adjustably according to the level of juice in the tun.

For this purpose, the height of the buoyancy element 36b on the cylindrical casing 37a is adjustable by means of a collar 33 fixed to the said element, and an associate screw 39.

The buoyancy element 36b can also be independent of the collar 39, in which case it slides on the cylindrical casing 37a, at the same time following the level of juice in the tun, between a low position limited by the buoyancy element 36a and a high position limited by the collar 33 of adjustable height.

The position of the buoyancy element 36b equipped with the collar 33, or of the collar 33 alone, is determined according to the height of the juice in the tun for which it is desirable that the buoyancy of the said element 36b should become greater than the attractive force of the magnets 31 and 41, in order to obtain the opening of the movable assembly 28, 29.

This apparatus in either of its alternative embodiments is therefore of especially simple design and production, and functions reliably and automatically, while at the same time not utilizing any source other than carbon dioxide. Furthermore, it requires no previous priming with water or juice.

Its use also makes it possible to give the wine-making vat other advantages as regards its suitability for the process carried out by the wine-maker.

At the start of fermentation, it may be expedient for the wine-maker to initiate the movements of juice while the production of carbon dioxide as a result of the conversion of the sugar into ethyl alcohol is still low. For this purpose, he carries out assisted circulation by introducing carbon dioxide gas coming from the bottle 14 into the atmosphere of the fermentation vat 1 by means of the valve VB12, the valve VE2 being closed.

It is also quite common, in the traditional processes for making red wine, to carry out an aeration of the must at the start of fermentation in order to activate the yeasts, and for this purpose the wine-maker can also introduce air of a quality suitable for comestibles by means of the valves VB12 and VB22, thereby ensuring perfectly controlled oxygenation, while at the same time continuing the washing operations, and without impairing the automatic functioning of the shutter, and in this way oxygenation can take place in the riser column 5 via the valve VB21.

During fermentation, still in order to adhere as closely as possible to his own particular traditional process, the wine-maker can easily adjust the periodicity of the phases of the rising of the juice and the washing of the marc head. For this purpose, it is sufficient, by means of the needle tap VR, to set a leakage flow of carbon dioxide gas taken from the gas atmosphere of the fermentation vat 1, in order thereby to change the operating frequency of the automatic shutter 20.

At the end of fermentation, when the production of carbon dioxide gas is decreasing, the wine-maker may consider it necessary to continue the steeping of the must in order to extract all the aromas and colouring substances from the marc. To achieve this, he can likewise adopt a method of assisted circulation by opening the valve VB12 and thus making an injection of carbon dioxide gas which also completely or partially replaces the production of carbon dioxide gas resulting from the alcoholic fermentation.

The pipeline 13a equipped with the reducing valve S and opening into the upper part of the tun 2 makes it possible to discharge the carbon dioxide gas which is obtained as a result of the fermentation and which, as mentioned above, passes periodically from the fermentation vat 1 towards the tun 2.

This arrangement thereby makes it possible to maintain a covering of carbon dioxide gas permanently above the grape products and to prevent any uncontrolled oxygenation of these.

The cooling exchanger 8 located on the upper face of the tun 2 makes it possible to have a cold wall ensuring the condensation of the alcohol and other volatile aromas, some of which would be carried along by the carbon dioxide gas and discharged towards the discharge collector 11. Moreover, the pipeline 13a for the discharge of carbon dioxide gas can be provided with a baffle box (not shown) at its outlet into the tun 2, in order to prevent condensates from being carried along.

The embodiment just described relates to a vat consisting of an assembly of a fermentation vat and of a tun, each being of a specific fixed volume. However, it often happens that, at the end of a harvesting period, the wine-maker has a quantity of berries corresponding to a particular vinestock which is insufficient to fill the fermentation vat to its level corresponding to approximately ¾ or 4/5 of its total volume. Under these conditions, the volume above the grapes in the fermentation vat and the rising height may be too great to ensure washing at the desired frequency, in view of the quantity of endogenous carbon dioxide gas arising as result of the fermentation of the juice. Under these conditions, it is then necessary to carry out an assisted circulation with exogenous carbon dioxide gas during all the phases of wine preparation of this reduced batch.

Figure 8:
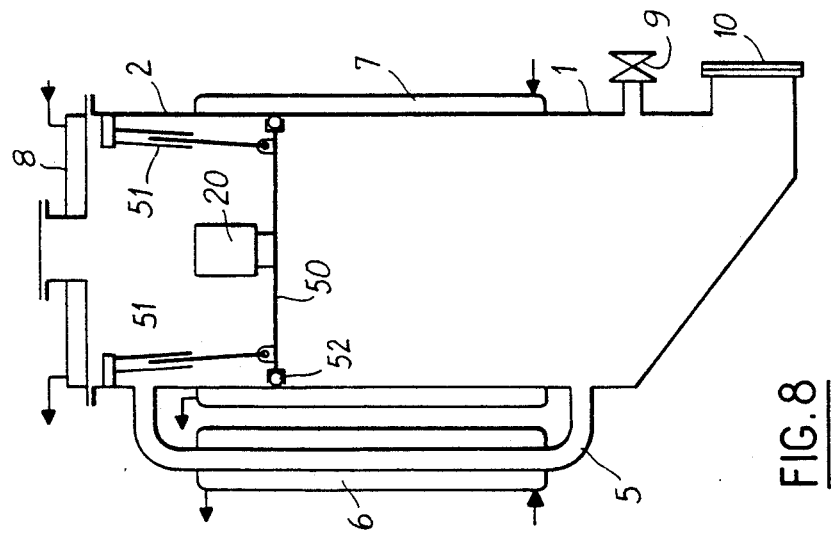
FIG. 8 is a schematic view of a second embodiment of the wine-making vat.

To avoid this constraint, the wine-making vat illustrated in FIG. 8 has a movable diaphragm 50 which delimits a lower volume forming the fermentation vat 1 and an upper volume forming the tun 2. The diaphragm 50 constitutes both the ceiling of the fermentation vat 1 and the floor of the tun 2. The height of the diaphragm 50 is adjusted, for example, by means of threaded rods or tacks 51, thus making it possible to match the volume of the fermentation vat 1 to the volume of the grapes. On the periphery of the diaphragm 50 there is a sealing system which can advantageously consist of a gasket 52 inflatable, for example, with compressed air or carbon dioxide gas, the gasket 52 being deflated during the adjustments and, in general, during the movements of the diaphragm 50, being put under pressure in order to ensure sealing on the inner wall of the vat.

Installed in the central part of the diaphragm 50 is the automatic washing valve 20 identical to that of one of the embodiments already described.

Furthermore, the equipment of the vat, i.e., the exchanges for adjusting the temperature of the juice, the vapor cooler on the tun and the associated carbon-dioxide circuits are clearly identical to those of the preceding embodiments.

Another alternative is to use the invention on an existing conventional vat, whether it is constructed of concrete or stainless steel or any other material. At all events, the vat has a cover 55 provided with a manhole 56 (FIG. 10) for the loading of the grapes, the release of carbon dioxide gas, inspection and cleaning after the wine-making. In this case, the tun 60 having the automatic washing shutter 20 is provided with a supporting collar 61 which is fastened to the cover 55 round the manhole 56. The lower part of the tun 60 is extended by a tube 62 of a diameter less than that of the manhole 56 and penetrating slightly into the latter. Sealing is advantageously ensured by means of an inflatable gasket 63.

As in the preceding embodiments, the equipment of the vat, i.e., the heat exchangers for the temperature of the juice, the vapor cooler on the tun and the associated carbon-dioxide circuits are clearly identical.

Figure 10:
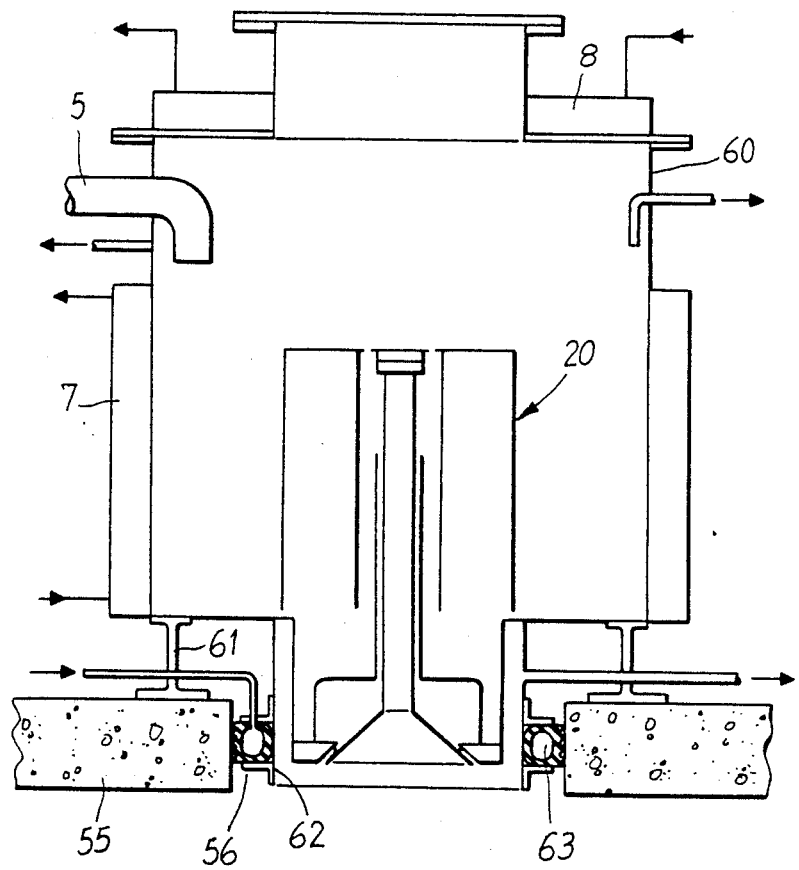
FIG. 10 is a schematic view showing the connection between a modular tun and an existing fermentation vat.

The juice riser column 5 is installed on the vat either directly at the decanting valve 9 or on a settling tank 65 arranged immediately downstream of the latter, as shown in FIG. 10.

Whatever the solution adopted for the vat and tun, all the materials used for constructing the elements of the wine-making vat, i.e., the fermentation vat, the tun, the automatic valve and the associated circuits, etc., are obviosly compatible with the requirements of the agricultural food industry. Furthermore, these materials are usually non-magnetic, this condition being required more especially for the component parts of the automatic valve 20.

The installation is also suitable for certain specific treatments for the conditioning of the juice, such as, for example, yeast addition, and makes it easier to carry out these. In fact, the indigenous yeasts present in the juice can be in a quantity or of an activity insufficient to ensure correct fermentation. This can occur, for example, when heavy rain has preceded the harvesting of the grapes. In this case, it is expedient to seed the juice with culture yeasts either at the start of or during fermentation. Recommended practice involves first rehydrating these culture yeasts to reactivate them, then adding clear juice, and finally introducing this preparation or leaven into the total volume of juice.

The tun according to the present invention, equipped with the automatic valve, makes it possible to carry out this operation easily, without resorting to special equipment for preparing the leaven.

If the yeast addition is carried out before the start of fermentation, the cover or manhole of the tun is open and the valve is in the closed position. The dry yeasts and the rehydration water are introduced into the tun. After the reactivation of the yeasts, the wine-maker obtains the rising of clear juice by introducing carbon dioxide gas into the vat to a level below that corresponding to the separation of the float and the movable assembly by means of the valve VB12, the valve VE1 being closed. When the yeast is under ideal conditions for its activity, the wine-maker closes the cover or the manhole of the tun and carries out an assisted circulation by introducing carbon dioxide gas into the vat by means of the valve VB12, in order to mix the leaven into the total volume of juice.

If yeast addition is carried out during fermentation, with the shutter in the opening position during a washing step, the wine-maker interrupts the automatic functioning of the said valve by discharging carbon dioxide gas from the vat by opening the valve VE2. The tun empties completely and the automatic valve reengages in the closing position. The wine-maker obtains the hydration of the yeasts as a result of the rising of clear juice by closing the valve VE2 which is subsequently returned to its open position after the level has been reached. After the leaven has been activated, he puts the valve back into automatic operation by closing the valve VE2.

A similar procedure can be adopted for an addition of sugar to the juice, in vineyards where this practice is allowed.

It thus emerges from the foregoing description that the present invention is especially suitable for making red wine, in that it makes it possible to achieve very good steeping of the marc in the juice. It is not used solely for this wine-making method but also makes it possible to improve the processes for preparing white wine.

However, to obtain quality wines, especially those called "blanc de blanc", it is preferable beforehand to carry out prefermentation steeping, which involving leaving the berries in the presence of the juice for approximately 48 hours, in order to extract the pectins and aromas from the skins. This operation is conducted at a temperature of 16° C. to 18° C. i.e. below the temperature allowing the ethyl alcohol fermentation to start. During prefermentation steeping and during fermentation itself, it is extremely important, for making white wine, to maintain anaerobic and aseptic conditions, this type of wine being even more sensitive to contamination and oxygenation than red wine. Here again, a wine-making vat equipped with a tun and with an automatic valve according to the present invention makes it possible to satisfy these conditions.

In fact, after possible stalk removal and pressing, the grapes are placed in the fermentation vat, but during this first steeping step the fermentation has not yet taken place in this vat. Assisted circulation is then carried out by injecting carbon dioxide gas into the vat.

At the end of this steeping, the grapes are extracted from the fermentation vat, and the juice is put back into the fermentation vat after the marc has been separated ("tapping"). When fermentation has started, the circulation of juice between the fermentation vat and the tun is obtained automatically by means of the carbon dioxide gas rising as result of the fermentation, as described above.

Circulation, assisted during steeping or natural during fermentation, is especially useful because it likewise makes it possible, in this wine-making method, to obtain a juice of uniform temperature and composition and to improve the quality of the wine produced, this being achieved while continuing to maintain an atmosphere of carbon dioxide gas above the juice.

Use in making "rosé" wine is also possible and moreover is obvious when it is remembered that a rosé wine is obtained either by a white-wine process from red grapes or by a red-wine process in which "tapping" is carried out in order to interrupt the steeping, fermentation being continued on the juice alone.

Thus, a wine-making installation according to the present invention meets the various oenological criteria making it possible to obtain the best possible wine from the grape crop in a natural and traditional way.

On the other hand, this installation makes it possible to obtain an adjustment of the temperature of the juice for the starting of fermentation and during fermentation, homogenization of the juice to obtain a temperature range as isothermal as possible, and also mass distribution of the fermentation reactions, and, for making red wine, to assist the steeping of the marc and the must.

Finally, it makes it possible to have a permanent covering of carbon dioxide on the grapes in order to ensure wine-making in an anaerobic and aseptic medium and good conversion of the aromas and alcohol, while at the same time displaying flexibility of use, so as to be adaptable to the traditional process peculiar to the vineyard, and simple and inexpensive operation and maintenance.

The invention has been described on the basis of fermentation obtained from grape berries, because this form of fermentation is most common.

However, the invention can be used for all forms of alcoholic fermentation, especially of fruit, the basic fermentation phenomena obviously being similar.

I claim:

1. Wine-making vat comprising
   (a) a lower fermentation vat (1)
   (b) an upper tun (2; 60) communicating with said lower fermentation vat (1) via a closeable washing port (4; 56) and connected with said fermentation vat by at least one column (5) for rising of juice from said fermentation vat toward said tun;
   (c) at least one valve means (20) adapted to place said tun and said fermentation vat in communication with each other, said valve means comprising
      (i) a fixed unit (21, 22, 23) fitted on said washing port (4; 56) and forming a valve seat (25);
      (ii) a vertical movable assembly (28, 29) interacting with said valve seat;
      (iii) a vertically movable float (35, 35a);
      (iv) sealing means (32) between said movable assembly and said movable float; and
      (v) means for retaining said movable assembly on said valve seat as a function of a level of juice in said tun detected by said float.

2. Wine making vat according to claim 1, wherein said fixed unit has a lower part comprising an annular piece (23) fitting on said washing port (4) and provided with a peripheral gasket (25) forming said valve seat and further comprising a tubular piece (21) fastened to said valve seat and forming a guide member for said movable assembly (28, 29).

3. Wine-making vat according to claim 2, wherein said tubular piece (21) is provided with a stop (26) adjustable in height on said tubular piece (21) and adapted to stop said movable assembly (28, 28) in a low position, and with means (26a) for guiding said float (35–35a).

4. Wine-making vat according to claim 2, wherein said movable assembly has a lower part with a frusto-conical portion (28) interacting with said peripheral gasket (25) forming said valve seat and which is extended by a tube (29) sliding inside said tubular piece (21) of said fixed unit.

5. Wine-making vat according to claim 2, wherein said sealing means (32) are arranged in an upper part of an inner tube (29) of said movable assembly (28, 29) and close off said annular orifice (40) of said movable float (35, 35a) in a closing position of said washing port (4) by said movable assembly (28, 29).

6. Wine-making vat according to claim 2, wherein said means for retaining said movable assembly 28, 29) on said valve seat (25) consist of a first permanent magnet (41) fixed to said float (35–35a) and of a second permanent magnet (31) fixed to said movable assembly (28, 29).

7. Wine-making vat according to claim 6, wherein said sealing means consists of a gasket (32) interposed between said first and second magnets (31, 41).

8. Wine-making vat according to claim 2, wherein said valve (20) is mounted on a movable diaphragm (50) of adjustable height which delimits a lower volume forming said fermentation vat (1) and an upper volume forming said tun (2).

9. Wine-making vat according to claim 2, wherein said valve means (20) is mounted in an independent tun (60) adapted to be fitted on an existing fermentation vat (1).

10. Wine-making vat according to claim 1, wherein said float (35) comprises two concentric cylindrical casings (36, 37) open at lower ends thereof and closed at upper ends thereof by a flat bottom (38) having an annular orifice (40) in its central part.

11. Wine-making vat according to claim 1, wherein said float (35a) consists of a cylindrical casing (37a) open in a lower part thereof and closed in an upper part thereof by means of a flat bottom (38a) having an annular orifice (40) in its central part and of first and second independent buoyancy elements (36a, 36b) arranged on said cylindrical casing (37a), said first one (36a) of said buoyancy elements compensating the weight of said float (35a), and said second buoyancy element (36b) ensuring that said movable assembly (28, 29) opens adjustably according to a level of juice in said tun (2, 60).

12. Wine-making vat according to claim 11, wherein the buoyancy element (36a) compensating the weight of said float (35a) is fastened to a lower part of said cylindrical casing (37a).

* * * * *

UNITED STATES PATENT AND TRADEMARK OFFICE
CERTIFICATE OF CORRECTION

PATENT NO. : 4,969,391

DATED : November 13, 1990

INVENTOR(S) : Haulot

It is certified that error appears in the above-identified patent and that said Letters Patent is hereby corrected as shown below:

On the Title page

Item [73], the word "Advancees" should be changed to --Avancees--.

Signed and Sealed this

Twenty-sixth Day of January, 1993

Attest:

STEPHEN G. KUNIN

Attesting Officer

Acting Commissioner of Patents and Trademarks